April 28, 1970 F. L. J. SANGSTER 3,509,383
PICKUP COMPRISING PRESSURE-SENSITIVE TRANSISTORS
Filed June 2, 1967 2 Sheets-Sheet 1

INVENTOR.
FREDERIK L.J.SANGSTER
BY
Frank R. Jifari
AGENT

INVENTOR.
FREDERIK L.J. SANGSTER
BY
Frank R. Trifari
AGENT

United States Patent Office 3,509,383
Patented Apr. 28, 1970

3,509,383

PICKUP COMPRISING PRESSURE-SENSITIVE TRANSISTORS

Frederik Leonard Johan Sangster, Emmasingel, Eindhoven, Netherlands, assignor to U.S. Philips Corporation, Inc., New York, N.Y., a corporation of Delaware Filed June 2, 1967, Ser. No. 643,262
Claims priority, application Netherlands, June 14, 1966, 6608194
Int. Cl. H03k *17/60*
U.S. Cl. 307—308 9 Claims

ABSTRACT OF THE DISCLOSURE

A pressure sensitive semiconductor transducer for generating two channel signals is provided with two pressure sensitive transistors, the emitter collector paths of which are series connected across a source of supply current.

The invention relates to a device comprising a pickup of semiconductor material for converting pressure vibrations into electric oscillations. It has for its object to provide a device comprising a stereo pickup which excels, while maintaining a high sensitivity in each of the channels, by small differences between the sensitivities of these channels. The latter property guarantees a reliable reproduction of the sound image.

It is known that the current passing through a transistor depends not only upon the mechanical pressure to which this transistor is exposed, but also upon temperature. If the transistor is exposed to pressure variations corresponding to those of sound oscillations, an alternating current will pass through the transistor, which depends upon the direct current adjustment of the transistor. Since this direct current depends not only upon the mechanical prestress but also upon the ambient temperature, it is necessary to stabilize this direct current.

It is known to stabilize the D.C. adjustment of transistors by means of a D.C. negative feedback. If this measure is applied to the two pressure-sensitive transistors of a stereo pickup, there remains the risk of, a discrepancy in the D.C. adjustment of each of the two pressure-sensitive transistors, which might product a troublesome shift in the sound image. If the two transistors are connected in cascade, the output of the second transistor being negatively fed back for direct current to the input of the first transistor, an undesirable difference between the D.C. adjustments and hence an undesirable difference between the pressure sensitivities of the two transistors may occur, since an undesirable increase of the D.C. adjustment of one transistor due to the negative D.C. feedback will produce a decrease of the D.C. adjustment of the other transistor. This brings about unbalance of the two channels.

The invention is characterized in that the pickup for working stereo signals comprises two pressure-sensitive transistors, the emitter-collector paths of which are traversed in series by the supply current.

The invention is based on the recognition of the fact that the D.C. series connection of the two transistors ensures that the pressure sensitivity of the two transistors is accurately maintained at the same value by a suitable choice of the mechanical prestress. In this manner the unbalance of the two stereo channels is eliminated.

The invention will be described with reference to the drawing.

FIG. 4A and FIG. 4B shows a special embodiment of a pressure-sensitive transistor for use in one of the aforesaid embodiments, wherein FIG. 4A is a diagrammatic plan view and FIG. 4B is a diagrammatic cross sectional view taken on the line A–B in FIG. 4A.

Figure 1:
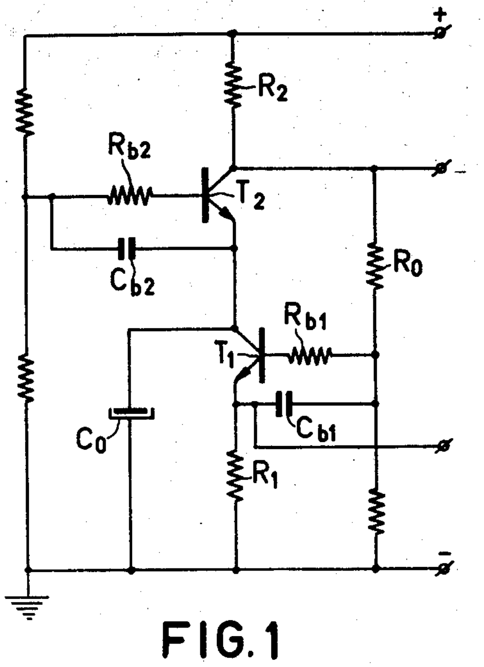
FIG. 1 shows one embodiment of the invention.

Referring to FIG. 1, reference $T_1$ and $T_2$ designate two pressure-sensitive transistors; one transistor is exposed to pressure variations corresponding to one stereo-signal and the other transistor is exposed to pressure variations corresponding to the stereo-signal of the other channel. The collector of the first transistor $T_1$ is directly connected to the emitter of the second transistor $T_2$, whereas the junction is connected to earth through a large capacitor $C_o$. This capacitor $C_o$, which forms a short-circuit for the signal frequencies provides a satisfactory A.C. separation between the two stereo channels. In parallel with the base-emitter junction of the two pressure-sensitive transistors is connected a series combination of a resistor $R_b$ and a decoupling capacitor $C_b$, the latter being connected to the emitter electrode and the resistor $R_b$ being connected to the base electrode of the relevant transistors. Between the output of the transistor $T_2$ and the input of the transistor $T_1$ is connected a resistor $R_o$, which counteracts variations of the direct current passing through the transistors and thus stabilizes them. The output signals are derived from two resistors, $R_1$ of the emitter circuit of the transistor $T_1$ and $R_2$ of the collector circuit of the transistor $T_2$. These resistors are chosen of equal values.

Figure 4A:
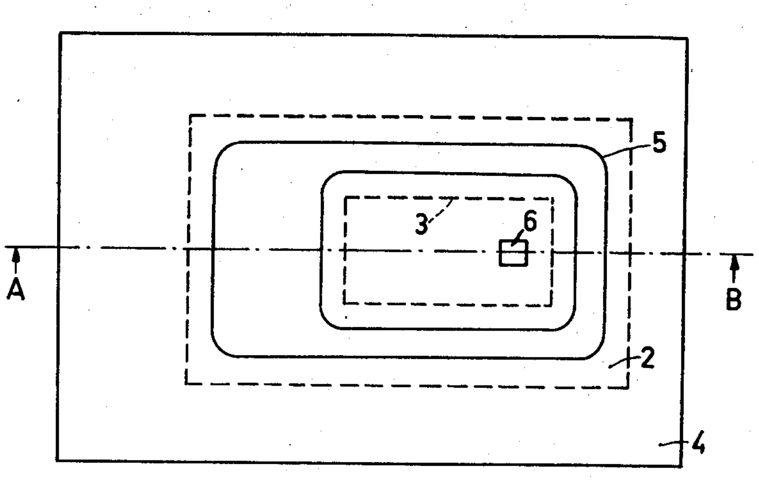
Figure 4B:
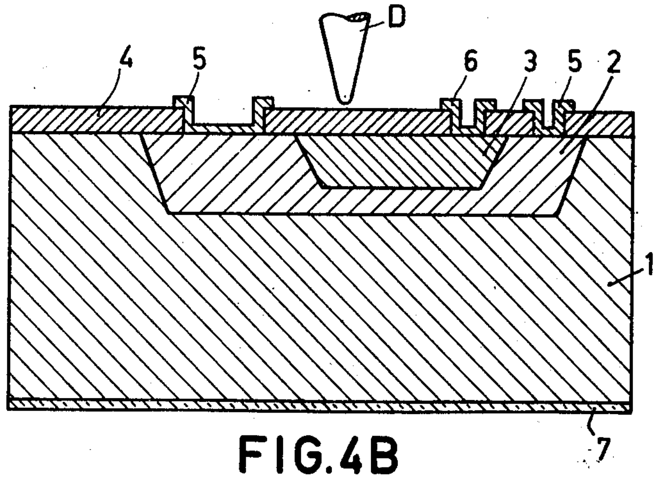

The transistors $T_1$ and $T_2$ of FIG. 1 may be constructed as shown in FIGS. 4A and 4B. The planar transistor shown in this figure comprises an n-type semiconductor body 1 of, for example, about 600 x 600$\mu$, which is provided on one side with an insulating layer 4, for example, a 0.5$\mu$ silica layer. On the side of the insulating layer 4, beneath the same, the p-type base zone 2 of, for example, 400 x 300$\mu$ and the n-type emitter zone 3 of, for example, 202 x 100$\mu$ are arranged. The collector zone is formed by the semiconductor material surrounding the base zone 2, which material belongs to the n-type body 1. The insulating layer 4 is provided with two conductors 5 and 6 for establishing conductive connections to the base zone 2 and the emitter zone 3, for which purpose windows are provided in the insulating layer, as is shown in FIG. 4B. The n-type semiconductor body 1 may be secured to a metal support 7 by known semiconductor techniques, which support serves at the same time as a collector electrode. By means of the diamond needle D the pressure vibrations are applied to the transistor. This needle exerts pressure on the part of the insulating layer 4, located directly above the emitter zone 3.

The ratio between the radius of the contact area of the diamond needle D and the emitter area and the thickness of the emitter and base zones are determinative of the type of arrangement in which the pressure sensitivity of the transistor is at a maximum.

If a transistor driven by a diamond needle is employed while said ratio is $\leq 1$, the pressure sensitivity of this transistor is at a maximum, when the A.C. variations at the base are suppressed. For this purpose FIG. 1 shows a resistor $R_{b_1}$ and a capacitor $C_{b_1}$, the resistor $R_{b_1}$ being a multiple of the internal base input resistance of the transistor concerned, while the capacitor $C_{b_1}$ forms a negligible impedance for the signal frequency.

If, on the contrary, a transistor is employed which is driven by a diamond needle with a ratio of $\gg 1$, the sensitivity to pressure variations appears to be at a maximum when the transistor is driven at a substantially constant base-emitter voltage $V_{be}$. This may be obtained by choosing the resistors $R_{b_1}$ and $R_{b_2}$ to be equal to zero.

Figure 2:
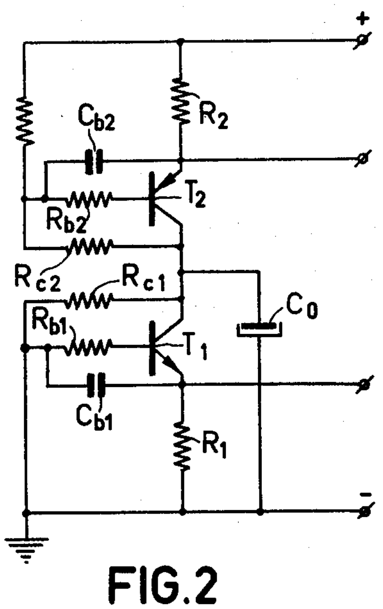
FIG. 2 shows a further embodiment of the invention.

FIG. 2 shows a further embodiment of the invention, in which two pressure-sensitive transistors of different conductivity type and having the same pressure sensitivity are employed, while the two collectors of the transistors $T_1$ and $T_2$ are directly connected to each other and the junction is connected to a point of constant potential via a decoupling capacitor $C_0$. In parallel with the base-emitter paths of the two transistors $T_1$ and $T_2$ there is again connected the series combination of the decoupling capacitor $C_{b_1}$ and $C_{b_2}$ the resistor $R_{b_1}$, $R_{b_2}$ one end of the latter being connected to the base of the relevant transistor. The two pressure-sensitive transistors are additionally negatively D.C. fed back by means of equal resistors $R_{c_1}$, $R_{c_2}$. The output signals of the two transistors are derived from the two resistors $R_1$, $R_2$ in the respective emitter circuits. The operation of this arrangement is similar to that of FIG. 1.

Figure 3:
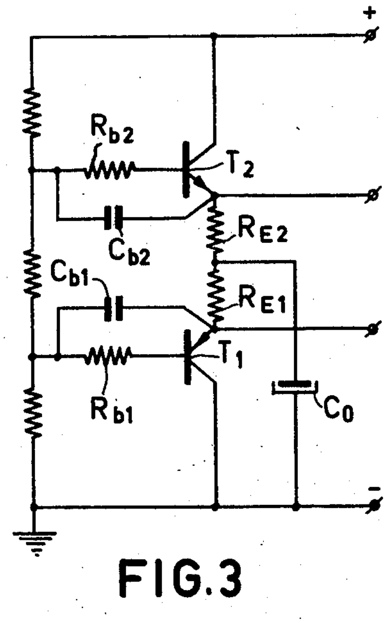
FIG. 3 shows again a further embodiment of the invention.

The embodiment shown in FIG. 3 comprises two transistors of opposite conductivity type and of equal pressure sensitivities. The emitters are, however, connected to each other through resistors $R_{E_1}$, $R_{E_2}$, which are again of equal value. The junction of the two resistors $R_E$ ($R_{E_1}$ and $R_{E_2}$) is connected to a point of constant potential via a large decoupling capacitor $C_0$. Between the emitter and base electrodes of the two transistors are again connected the series combinations of the resistors $R_{b_1}$, $R_{b_2}$ and capacitors $C_{b_1}$, $C_{b_2}$ in the manner described for the preceding arrangements. The two output signals are derived from the emitters of the two transistors $T_1$ and $T_2$.

The resistors $R_{E_1}$, $R_{E_2}$ are high with respect to the base-emitter resistances of the two transistors $T_1$ and $T_2$. In this manner a satisfactory negative D.C. feedback is obtained for each of these transistors, while the impedance level from which the output signals are derived remains sufficiently high. Otherwise this embodiment is analogous to the preceding embodiments.

What is claimed is:

1. A device for converting a pair of pressure vibrations into electrical oscillations, comprising first and second pressure sensitive transistors, means for applying each of said pair of pressure vibrations respectively to each of said transistors, means forming said two transistors into a series connection with a direct current path between the emitter collector path of each of said transistors, means applying a current to the series connection of said emitter collector paths and said direct current path, and means deriving an electrical output from each of said transistors respectively representative of each of said pressure vibrations.

2. A device as claimed in claim 1 further including a capacitor connected in parallel with the emitter-base path of each transistor.

3. A device as claimed in claim 1 further including a series combination of a resistor and a capacitor connected in parallel with the emitter-base path of each of the transistors, the resistors being connected to the base.

4. A device as claimed in claim 1 wherein the emitter-collector path junction of each of said transistors is connected through a capacitor to a point of constant potential.

5. A device as claimed in claim 1 where the two pressure-sensitive transistors are of the same conductivity type.

6. A device as claimed in claim 5 wherein a negative D.C. feedback is provided from the output of the second transistor to the input of the first transistor.

7. A device as claimed in claim 1 wherein the two pressure-sensitive transistors are of different conductivity types, and each of the transistors has its own negative D.C. feedback.

8. A device as claimed in claim 7, wherein the two emitters of the two transistors are connected to each other through resistors, the junction of which is connected through a capacitor to a point of constant potential.

9. A device for converting first and second machanically vibratory signals to corresponding electrical oscillations comprising first and second pressure sensitive transistors each having emitter, base and collector semiconductor regions, means applying said first and second mechanically vibratory signals in the form of pressure variations to a respective one of said transistors, each of said pressures applied to each of said transistors so as to create pressure variations in a semiconductor region of each transistor, means forming said two transistors into a series connection with a direct current path between the emitter-collector paths of each of said first and second transistors, means applying a direct current to the series connection of said emitter-collector paths and said direct current path, and means deriving an electrical output from each of said transistors respectively representative of each of said pressure variations.

References Cited

UNITED STATES PATENTS

| | | | |
|---|---|---|---|
| 3,292,057 | 12/1966 | Touchy | 307—308 |
| 3,319,140 | 5/1967 | Toussaint et al. | 179—110 |
| 3,365,553 | 1/1968 | Touchy et al. | 179—110 |
| 3,353,012 | 11/1967 | Baude | 307—299 |

DONALD D. FORRER, Primary Examiner

DAVID M. CARTER, Assistant Examiner

U.S. Cl. X.R.

331—65